United States Patent
Gleim

(10) Patent No.: US 6,954,407 B1
(45) Date of Patent: Oct. 11, 2005

(54) CURRENT TO VOLTAGE CONVERTER AMPLIFIER FOR USE IN A DATA READING DEVICE

(75) Inventor: Guenter Gleim, Villingen-Schwenningen (DE)

(73) Assignee: Deutsche Thomson-Brandt GmbH, Villingen-Schwenningen (DE)

( * ) Notice: Subject to any disclaimer, the term of this patent is extended or adjusted under 35 U.S.C. 154(b) by 0 days.

(21) Appl. No.: 09/335,647

(22) Filed: Jun. 18, 1999

(30) Foreign Application Priority Data

Jun. 19, 1998 (EP) .................................. 98401503

(51) Int. Cl.[7] ................................................ G11B 7/00
(52) U.S. Cl. ................................ 369/44.11; 369/44.12; 369/44.36; 360/46; 360/67; 361/685; 257/257
(58) Field of Search ................... 369/44.11, 44.12, 369/44.19, 120, 44.15, 121, 44.23, 47.5, 369/116, 53.27, 112.12, 44.36, 112.29; 250/227.11; 257/257; 438/59; 375/229, 316; 361/749, 361/748, 685; 360/97.01, 245.8, 264.2, 67, 360/68, 98.01, 46, 66

(56) References Cited

U.S. PATENT DOCUMENTS

| | | | | |
|---|---|---|---|---|
| 4,626,679 A | * | 12/1986 | Kuwayama et al. | 369/44.12 |
| 4,663,749 A | * | 5/1987 | Bierhoff et al. | 369/44.36 |
| 4,920,395 A | * | 4/1990 | Muro | 257/257 |
| 5,007,038 A | * | 4/1991 | Nakane et al. | 369/44.11 |
| 5,107,319 A | * | 4/1992 | Lauterbach et al. | 257/257 |
| 5,242,839 A | * | 9/1993 | Oh et al. | 438/59 |
| 5,257,285 A | * | 10/1993 | Thorp | 375/229 |
| 5,298,739 A | * | 3/1994 | Hiroki et al. | 250/227.11 |
| 5,765,187 A | * | 6/1998 | Shimizu et al. | 710/22 |
| 5,778,420 A | * | 7/1998 | Shitara et al. | 710/57 |
| 6,025,988 A | * | 2/2000 | Yan | 361/685 |
| 6,326,553 B1 | * | 12/2001 | Yim et al. | 174/254 |

FOREIGN PATENT DOCUMENTS

GB    2212971 A    8/1989 .......... H02G 11/00

* cited by examiner

Primary Examiner—William Korzuch
Assistant Examiner—Kim-Kwok Chu
(74) Attorney, Agent, or Firm—Joseph S. Tripoli; Harvey D. Fried; Patricia A. Verlangieri

(57) ABSTRACT

A device for amplifying and converting current signals into voltage signals for processing The current signals are delivered by sensors, e.g. optical transducers, magnetical heads. The current signals are first amplified using a current to current amplifier, the amplified current signals are then transported using electrical conductors and eventually amplified using a current to voltage amplifier. The invention may find application in consumer electronic devices, cars, planes, industrial machines.

4 Claims, 1 Drawing Sheet

CURRENT TO VOLTAGE CONVERTER AMPLIFIER FOR USE IN A DATA READING DEVICE

BACKGROUND OF THE INVENTION

The present invention relates to devices in which current signals are amplified and converted into voltage signals for processing. Such devices have a wide application range and may for example be found in systems where sensors delivering a current are used to monitor processes and/or to measure physical parameters of an environment.

Various sensors delivering a current find applications in a measurement of physical parameters. Such a sensor may for example be a magnetical head which comprises a gap and delivers a current when moved in the presence of a magnetical field. This current is proportional to the magnetic field. Another example for such a sensor is a photodetector which delivers a current proportional to a number of photons detected. Often the currents delivered by such sensors have comparatively small values i.e. the current signals may easily be subjected to interference from electromagnetic radiation emitted by sources nearby the sensor. The interference from this electromagnetic radiation may lead to erroneous measurements because the currents delivered by the sensors are no longer predictable functions of the physical parameters to measure. In order to minimize the negative impact of interference on the current signals it is known to amplify the current signals as near to the sensor as possible and obtain amplified signals for which the interference with the electromagnetic radiation is less critical.

In known Optical disk players an optical disk is scanned using a light beam and light reflected by the optical disk is measured using a plurality of photodetectors. The photodetectors are mounted on a movable optical pickup which is moved relatively to the disk in order to position the light beam relatively to the optical disk. The photodetectors deliver current signals having values in the range of for example a few $\mu A$. These current signals are easily disturbed through interference with electromagnetic fields generated by positioning coils which are also comprised in the movable optical pickup. Therefore the current signals are amplified with amplifiers mounted on the same movable optical pickup near to the photodetectors. The amplified signals are voltages with values in the range of a few mV. The amplified signals are transported to further amplifiers where they are amplified to voltage signals which have values in the range of a few V. The further amplifiers are distanced from the movable optical pickup and connected to the amplifiers on the movable optical pickup using flexible electrical conductors. The voltage signals are thus representative of the current signals delivered by the photodetectors and may for example be used for further digital processing i.e. decoding of the signals read from the disk. It is of great importance that the voltages signals obtained be a reliable representation of the current signals and in this sense to minimize the number of errors which might occur at the amplification and transportation of the current and amplified signals.

During transportation from the amplifier to the further amplifiers the amplified signals may mutually influence each other because of crosstalk between the flexible electrical conductors. This is due to the fact that the amplified signals are voltages and this causes even more errors in the voltage signals at the output of the further amplifiers.

Most known optical disk players make use of error correction methods and may correct a limited numbers of errors in the decoded signals read from the disk. As has been said previously, a first source of errors may be due to amplification and transportation of the current and amplified signals, but also to crosstalk between flexible electrical conductors. A second source of errors may be disturbances on the disk being read e.g. scratches, fingerprints or aging related degradation of layers used to store the signal on the disk. If all errors resulting from the addition of the first and second source of errors need to be corrected then the value of the addition must not be greater than the limited number which may be handled by the error correction method. While the second source of errors most frequently and inevitably affects optical disks, the first source depends on characteristics of the optical disk player. These characteristics may be influenced on by a manufacturer of the optical disk player and eventually determine a quality of the latter player.

The amplifiers and further amplifiers mentioned above are respectively current to voltage (I:U) and voltage to voltage amplifiers (U:U). Each of these amplifiers and further amplifiers, e.g. operational amplifiers, may use a predetermined voltage UD to operate, i.e. UD is used as a reference voltage to output respectively the amplified signals and voltage signals at a determined voltage value. UD is determined relatively to a ground potential UG (which should be UG=0 V) which is common to all part of the optical disk player and to which each amplifier is connected. The amplifiers mounted on the movable optical pickup are connected to ground via a flexible electrical conductor which has a determined resistance value. The consequence of the determined resistance value is that the amplifier's ground potential isn't the same as the further amplifier's ground potential and the reference voltage UD which should be the same for both amplifiers and further amplifiers varies. Eventually the voltage signals at the output of the further amplifiers may have values which are erroneous due to an altered reference voltage applied to the further amplifiers. As mentioned above the voltage signals may be used for further digital processing and a change in their value, i.e. an erroneous value, may cause loss of bits. This loss of bits is part of the previously discussed first source of errors.

In a similar way as for optical disk players the processing of current signals providing from sensors in other devices (e.g. magnetic tape players, speed or process monitoring in cars or industrial machines) may produce erroneous values because the current signals are amplified more than once with amplifiers which are distant from each other and have to share a common ground potential which may vary from one amplifier to the other.

It is one aim of the present invention to overcome the problem of erroneous voltage signals resulting from amplification and transportation of current signals providing from sensors as described above.

It is another aim of the present invention to provide for optical disk players which have a reduced number of errors from the first source of errors.

SUMMARY OF THE INVENTION

The present invention provides a device for amplifying and converting a plurality of current signals into voltage signals which comprises first amplifying means for amplifying the plurality of current signals and obtaining a plurality of first amplified signals as currents, second amplifying means for amplifying the first amplified signals and obtaining the voltage signals, connection means dedicated to each of the plurality of first amplified signals which connect the first amplifying means to the second amplifying means and comprise elongated flexible electrical conductors which receive the first amplifying means and deliver the first amplified signals at an input of the second amplifying means.

The invention may use current to current (I:I) amplifiers as first amplifiers means and I:U amplifiers as second amplifying means. The difference of ground potential between the I:I and I:U amplifiers does not affect the value of the voltage signals at the output of the second amplifying means. The values of the voltage signals are less erroneous than in prior art.

The fact that the amplified signals are currents reduces crosstalk in the connection means and further contributes to reducing the errors in the voltage signals.

The present invention further provides a movable optical pickup device comprising at least a focusing lens, a plurality of optical transducers which each deliver a current signal, an optical lens assembly for directing a light beam to the optical transducers, first current to current amplifying means to which the plurality of current signals are fed and which amplify the plurality of current signals to obtain a plurality of first amplified signals, and connection means for connecting an output of the first current to current amplifying means with a flexible elongated electrical conductor such to provide a second amplifying means distinct from the movable optical pickup device with the first amplified signals.

The present invention further provides an optical disk reader and/or recorder which allows at least to read data from an optical disk using at least one light beam and comprising at least a movable optical pickup which moves relatively to the optical disk in order to position the light beam relatively to the optical disk. A plurality of optical transducers are mounted on the movable optical pickup and receive a part of the light beam reflected from the optical disk, delivering a plurality of current signals. First current to current amplifying means mounted on the movable optical pickup amplify the plurality of current signals to obtain a plurality of first amplified signals, second amplifying means mounted on a fixed part of the optical disk reader and/or recorder distanced the movable optical pickup amplify the first amplified signals to obtain voltage signals. The optical disk reader and/or recorder further comprises connection means dedicated to each of the plurality of first amplified signals and which connect the first amplifying means to the second amplifying means.

Hence the optical disk reader and/or recorder according to the invention or the device using the pickup device according to the invention allow to significantly reduce the number of errors in the voltage signals, and disks having defects are more likely to be readable since generally the error correction method may correct a greater number of errors providing from defectuous disks than in prior art. Of course the number of correctable errors may not exceed the limited number correctable by the error correction method.

The present invention further achieves the mentioned aim with a magnetical data reading device and/or recording device comprising at least a magnetical head delivering a plurality of current signals, first amplifying means for amplifying the plurality of current signals and obtaining a plurality of first amplified signals as currents. The device further comprises second amplifying means for amplifying the first amplified signals and obtaining the voltage signals, and connection means dedicated to each of the plurality of first amplified signals which connect the first, amplifying means to the second amplifying means and comprise elongated flexible electrical conductors which receive the first amplified signals at an output of the first amplifying means and deliver the first amplified signals at an input of the second amplifying means.

The magnetical data reading and/or recording device may for example be a magnetic Hard Disk or a magnetic tape device. The invention is particularly advantageous in that it reduces the number of reading error in such devices when the data is stored digitally.

BRIEF DESCRIPTION OF THE DRAWINGS

The following is a description of at least one way of carrying out the invention which will help understanding the claimed invention and will be made with reference to Figures, wherein:

DESCRIPTION OF THE PREFERRED EMBODIMENTS

It is understood that the described ways of carrying out the invention are given as examples only and are not limitative of the invention. Other embodiments and variations of the devices described may well be realized by a person skilled in the art and remain in the scope of the claimed invention.

Figure 1:
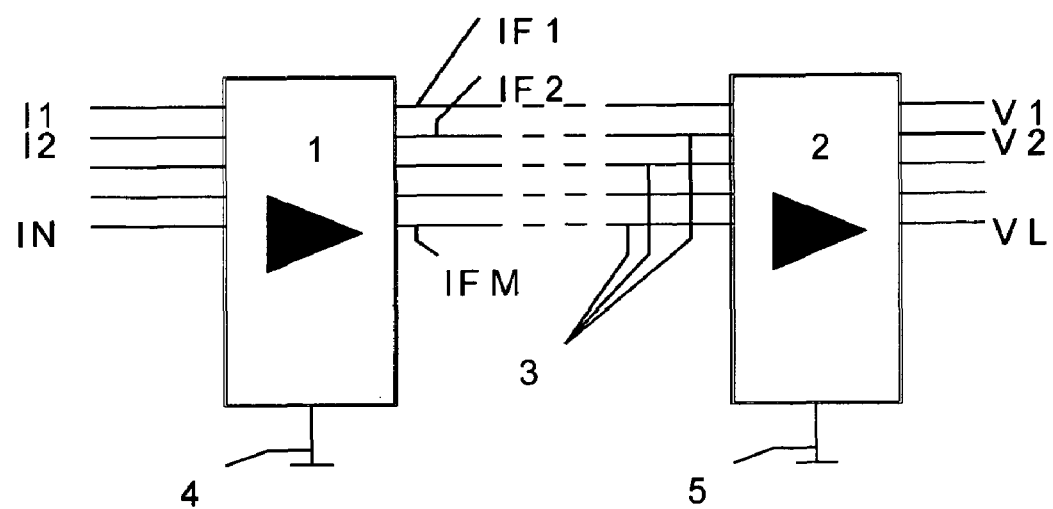
FIG. 1 contains a schematic representation of a device for amplifying and converting according to the invention, FIG. 2 contains a schematic representation of an optical disk reader and/or recorder.

The device shown in FIG. 1 is used to amplify current signals $I1, I2, \ldots, IN$ into voltage signals $V1, V2, \ldots, VL$. An I:I, i.e. current to current amplifier 1 amplifies the current signals $I1, I2, \ldots, IN$ to obtain first amplified signals namely amplified currents $IF1, IF2, \ldots, IFM$. Input connections of an I:U, i.e. current to voltage amplifier 2 are connected to output connections of the I:I amplifier 1 by connection means 3. The I:U amplifier 2 amplifies and converts the amplified currents $IF1, IF2, \ldots, IFM$ into voltage signals $V1, V2, \ldots, VL$.

It is understood that the I:I amplifier 1 which is represented by a single part in FIG. 1 may in fact comprise a plurality of I:I amplifiers, e.g. one for each current signal $I1, I2, \ldots, IN$. In a similar manner the I:U amplifier 2 which is represented using a single part in FIG. 1 may in fact comprise a plurality of I:U amplifiers.

The connection means 3 may be elongated electrical conductors.

The I:I and I:U amplifiers are powered by at least one power source which is not shown in FIG. 1. The I:I and I:U amplifier are connected to ground via ground connections 4 and 5. It is irrelevant for the device shown in FIG. 1 if the actual value of the ground potential is the same at both connections 4 and 5. More precisely, if the ground potential at connection 4 is different than the ground potential at connection 5 this doesn't affect the values of the amplified currents $IF1, IF2, \ldots, IFM$. As a consequence the voltage signals $V1, V2, \ldots, VL$ remain in a fixed relation to the current signals $I1, I2, IN$, i.e. they are not influenced by a difference in the ground potential between the connections 4 and 5 which affected the successive I:U and U:U amplification in prior art.

$V1, V2, \ldots, VL$ may be used for digital processing, i.e. they have to be converted in a rectangular signal. Typically the conversion of the voltage signals into a rectangular signal is done in a converter (not shown in FIG. 1) which outputs a voltage VNULL when the voltage signal's value is below a threshold, and a voltage VONE when the voltage signal exceeds a determined threshold value. The length of the obtained VNULL and VONE segments in the rectangular signal represents e.g. a number of digital 0 and 1 bits respectively.

V1, V2, . . . , VL may be combined between each other, e.g. added subtracted using devices associated to the amplifier 2 but not shown in FIG. 1. I1, I2, . . . , IN may be the result of addition or subtraction of current signals providing from sensors not shown in FIG. 1.

Figure 2:
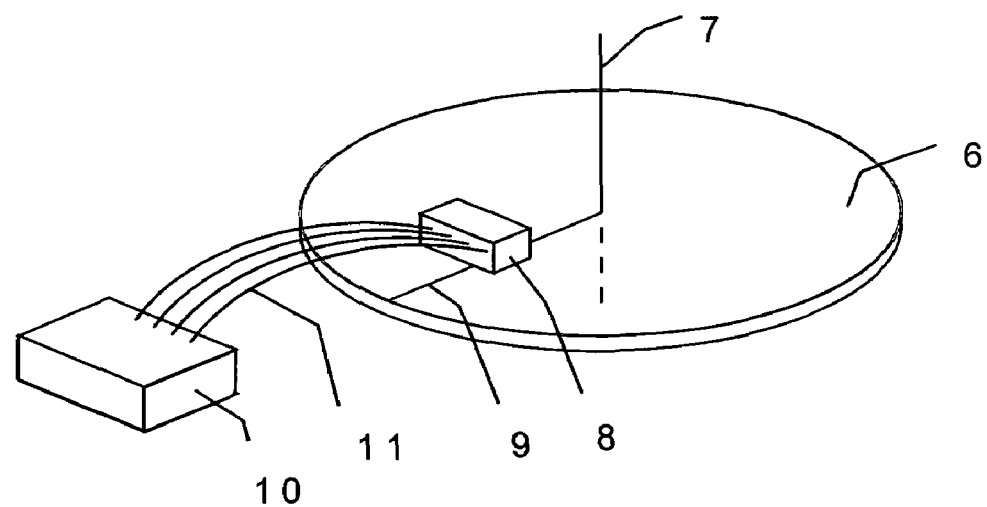

FIG. 2 shows an optical disk 6 which spins around a rotation axis 7. All parts in FIG. 2 are comprised in an optical disk reader and/or recorder (not shown). A movable optical pickup 8 may be activated above a surface of the optical disk 6 along an axis which corresponds to a radius 9 using activating and guiding means not shown. As is well known in the art the movable optical pickup 8 comprises at least a focusing lens (not shown), photodetectors (not shown) for measuring light reflected by the optical disk and an optical lens assembly for directing a reflected light beam to the photodetectors (not shown). These photodetectors are optical transducer which deliver current signals, e.g. I1, I2, . . . , IN. The movable optical pickup 8 also comprises an I:I amplifier 1 (not shown in FIG. 2) which amplifies the current signals into amplified currents e.g. IF1, IF2, . . . , IFM. An I:U amplifier 2 (not shown) distanced from the movable optical pickup 8 may be mounted on e.g. a printed circuit board 10 of the optical disk player (not shown).

The movable optical pickup 8 is connected to the I:U amplifier using a flexible band 11. This way the movable optical pickup may move independently from fixed parts of the optical disk player and remain electrically connected to it. The flexible band 11 supports a number of elongated electrical conductors which are typically close and parallel to each other. The flexible electrical conductors among other purposes further allows to supply the I:I amplifier and other devices on the movable optical pickup 8 with power and a ground contact. The flexible electrical conductors feed the amplified currents IF1, IF2, . . . , IF3 to the I:U amplifier. This way the relatively weak current signals delivered by the photodetectors are amplified and transmitted to fixed circuitry of the optical disk reader and/or recorder for further processing with a minimum of errors or more precisely with a most exact representation of the current signals.

What is claimed is:

1. Movable optical pickup device comprising:
   a focusing lens,
   a plurality of optical transducers, each delivering a current signal,
   an optical lens assembly for directing a light beam to said optical transducers,
   first current to current amplifying means to which a plurality of the current signals are fed to obtain a plurality of first amplified signals, and
   connection means which connect said first current to current amplifying means to a second current to voltage amplifying means distanced from said movable optical pickup device and comprise elongated flexible electrical conductors which receive said first amplified current signals at an output of said first current to current amplifying means and deliver said first amplified current signals at an input of said second current to voltage amplifying means.

2. Optical disk reader and/or recorder adapted to read data from an optical disk using at least one light beam, comprising:
   a movable optical pickup which moves relative to said optical disk in order to position said light beam relative to said optical disk,
   a plurality of optical transducers mounted on said movable optical pickup and which receive a part of said light beam reflected from said optical disk and deliver a plurality of current signals,
   first current to current amplifying means mounted on said movable optical pickup to amplify said plurality of current signals to obtain a plurality of first amplified current signals,
   second amplifying means mounted on a fixed part of said optical disk reader and/or recorder distanced from said movable optical pickup and which amplify said first amplified current signals to obtain voltage signals, and
   connection means dedicated to each of said plurality of first amplified current signals which connect said first amplifying means to said second amplifying means.

3. Optical disk reader and/or recorder according to claim 2, further comprising:
   first processing means for processing said voltage signals in order to obtain rectangular shaped signals.

4. Magnetic data reading device and/or recording device comprising:
   a magnetic head for delivering a plurality of current signals,
   first current to current amplifying means to which a plurality of the current signals are fed to be amplified to obtain a plurality of first amplified current signals, and
   connection means which connect said first current to current amplifying means to a second current to voltage amplifying means distanced from said magnetic head and comprise elongated flexible electrical conductors which receive said first amplified current signals at an output of said first current to current amplifying means and deliver said first amplified current signals at an input of said second current to voltage amplifying means.

* * * * *